United States Patent [19]

Tsunekawa et al.

[11] Patent Number: 4,820,667
[45] Date of Patent: Apr. 11, 1989

[54] HIGH STRENGTH ZIRCONIA CERAMIC

[75] Inventors: Kyosuke Tsunekawa, Chita; Ken Fukuta, Ama; Muneyuki Iwabuchi, Handa, all of Japan

[73] Assignee: NGK Insulators, Ltd., Aichi, Japan

[21] Appl. No.: 86,388

[22] Filed: Aug. 17, 1987

[30] Foreign Application Priority Data

| Aug. 18, 1986 [JP] | Japan | 61-193180 |
| Mar. 24, 1987 [JP] | Japan | 62-70072 |
| Aug. 12, 1987 [JP] | Japan | 62-201315 |

[51] Int. Cl.$^4$ .................. C04B 35/48; C04B 35/50; C04B 35/10; C04B 35/04
[52] U.S. Cl. .................................. 501/104; 501/105
[58] Field of Search .......................... 501/104, 105

[56] References Cited

U.S. PATENT DOCUMENTS

| 4,186,072 | 1/1980 | Blumenthal et al. | 204/195 S |
| 4,221,650 | 9/1980 | Friese et al. | 501/105 |
| 4,525,464 | 6/1985 | Claussen et al. | 501/105 |
| 4,587,225 | 5/1986 | Tsukuwa et al. | 501/105 |

FOREIGN PATENT DOCUMENTS

| 55-1595 | 1/1980 | Japan . |
| 58-32066 | 2/1983 | Japan . |
| 60-226457 | 11/1985 | Japan . |

OTHER PUBLICATIONS

Thermochemistry of $MgAl_2O_4$-$Al_{8/3}O_4$ Defect Spinels, Navrotsky et al., J. Am. Ceram. Soc., 69 [5] 418-22 (1986), pp. 418-422.

Mechanical Properties of $Y_2O_3$—Stabilized Tetragonal $ZrO_2$ Polycrystals After Ageing at High Temperature, J. Am. Ceram. Soc., 69[7] 519-22(1986).

Mechanical Properties and Thermal Stability of $CeO_2$-Containing Tetragonal Zirconia Polycrystals, Am. Ceram. Soc. Bull., 65[10] (1986).

Thermal Shock Resistance of $ZrO_2$ Ceramics Stabilized by Rare Earth Oxides, Watanabe et al., Yogyo Kyokai-Shi 94 [3] 1986.

Primary Examiner—Mark L. Bell
Attorney, Agent, or Firm—Parkhurst, Oliff & Berridge

[57] ABSTRACT

A high strength zirconia ceramic composition consisting essentially of a compound of $ZrO_2$ containing less than 5.0 mol % $Y_2O_3$ as a stabilizer and further containing 1-30 wt % aluminum and magnesium contents to the amount of the compound of $ZrO_2$ in terms of $Al_2O_3$ and MgO. In the case that the compound of $ZrO_2$ further contains $CeO_2$ as a stabilizer, the total amount of $Y_2O_3$ and $CeO_2$ is determined to be 1.0-15 mol % to the amount of the compound of $ZrO_2$.

5 Claims, 7 Drawing Sheets

HIGH STRENGTH ZIRCONIA CERAMIC

BACKGROUND OF THE INVENTION

1. Field of the Invention

The present invention relates to zirconia ceramics and is more particularly concerned with zirconia ceramic compositions superior in bending strength, acid resistance and thermal stability.

2. Discussion of the Background

Zirconia ceramics containing 1.5–5.0 mol% yttria as a stabilizer are each known in the art as a partially stabilized zirconia ceramic (PSZ) which has been developed as a high strength zirconia ceramic useful for mechanical structure materials. The partially stabilized zirconia ceramic is, however, still insufficient in bending strength. In Japanese Patent Early Publication No. 60-226457, there has been proposed a method producing a high strength zirconia ceramic the bending strength of which is higher than that of the partialy stabilized zirconia ceramic. In this method, raw material fine powder with a specific primary mean particle diameter was mixed at a predetermined ratio and made by Hot Isostatic Pressing or sintered by uniaxial pressing to produce a ceramic composition consisting essentially of $ZrO_2$ containing 1.5–5.0 mol% $Y_2O_3$ and $Al_2O_3$-MgO as a stabilizer.

During change of the ambient temperature from a high temperature to room temperature, the zirconia ceramic in the cubic structure form transforms into the tetragonal structure then to the monoclinic structure form with consequent volume changes. When the crystal structure changes on cooling from tetragonal to monoclinic, the zirconia ceramic is degraded due to a volume expansion thereof. For the purpose of preventing such degradation, there has been proposed a method of restraining the transformation of crystal stucture in $ZrO_2$ by solid solution of a stabilizer such as CaO, MgO, $Y_2O_3$ and the like. At present, $Y_2O_3$ is used as the stabilizer to produce a partially stabilized zirconia ceramic of high strength and fracture toughness in the tetragonal structure form at room temperature. Such partially stabilized zirconia ceramics are, however, unstable in crystal phase and transform into the monoclinic structure when heated at a relatively low temperature within a range of 200°–400° C., resulting in deterioration in strength, fracture toughness and thermal stability thereof.

To enhance the strength and thermal stability, a zirconia ceramic composition consisting essentially of $ZrO_2$ containing $Y_2O_3$ and $Al_2O_3$ has been proposed in Japanese Patent Early Publication No. 58-32066, and a zirconia ceramic composition consisting essentially of $ZrO_2$ containing $Y_2O_3$, CeO and $Al_2O_3$ has been further proposed in Japanese Patent Early Publication No. 61-77665. In the former publication, a mixture of $Al_2O_3$ and MgO was suggested, but the mixture ratio of the oxides was not confirmed. In addition, it has been found that the zirconia ceramic composition proposed in the former publication is not useful to enhance the thermal stability, whereas the zirconia ceramic composition proposed in the latter publication is not useful to enhance the strength.

SUMMARY OF THE INVENTION

The present invention has now found that the strength of partially stabilized zirconia ceramics is greatly influenced by the mixture ratio of the oxides $Al_2O_3$ and MgO and that if the mixture ratio of the oxides is out of a predetermined extent, the bending strength of the partially stabilized zirconia ceramics may not be increased. It is, therefore, a primary object of the present invention to provide a partially stabilized zirconia ceramic superior in bending strength, acid resistance and thermal stability on a basis of determination of an optimal mixture ratio between the oxides.

According to the present invention, there is provided a high strength zirconia ceramic composition consisting essentially of a compound of $ZrO_2$ containing less than 5.0 mol% $Y_2O_3$ as a stabilizer and further containing and 1-30 wt% aluminum and magnesium contents the amount of the compound of $ZrO_2$ in terms of $Al_2O_3$ and MgO. In the case that the zirconia ceramic composition is produced without $CeO_2$, the ingredient amount of $Y_2O_3$ has been determined to be 1.5–5.0 mol% to the compound of $ZrO_2$. In the case that the zirconia ceramic composition is produced with $CeO_2$, the ingredient amount of $Y_2O_3$ has been determined to be 0.5–5.0 mol% to the compound of $ZrO_2$, and the ingredient amount of $CeO_2$ has been determined to be 0.5–12.0 mol% to the compound of $ZrO_2$, provided that the total amount of $Y_2O_3$ and $CeO_2$ has been determined to be 1.0–15 mol%. It is preferable that the zirconia ceramic composition contains 1.5–5.0 mol% $Y_2O_3$ (or 1.5–3.5 mol% $Y_2O_3$ and 2–5 mol% $CeO_2$) as a stabilizer and further contains 1–5 wt% aluminum and magnesium contents to the amount of the compound of $ZrO_2$ in terms of $Al_2O_3$ and MgO. With respect to the aluminum and magnesium contents in the composition, it is desirable that the molar ratio ($Al_2O_3$/MgO) between the aluminum and magnesium contents is determined to be in the following extents (a)–(c) in terms of $Al_2O_3$ and MgO.

(a) 35–45/65 –55
(b) 60–75/40 –25
(c) 85–99/15 –1

Preparation of raw materials for the zirconia ceramic composition can be made by a method of mixing oxide powder of alumina-magnesia system or spinel powder with zirconia powder, a method of mixing each powder of alumina and magnesia with zirconia powder, a method of obtaining powder from aqueous solutions of ions of zirconium, yttrium, aluminum, magnesia and the like by means of wet mixing method. Preferably, the following two methods are adapted to preparation of the raw materials for the zirconia ceramic composition. In a primary preparation method, either mixed powder of $Al_2O_3$-MgO or aqueous salt solutions of $Al_2O_3$-MgO is added to mixed powder of $ZrO_2$-$Y_2O_3$ or $ZrO_2$-$Y_2O_3$-$CeO_2$. In a secondary preparation method, either powder or aqueous salt solution of MgO is added to mixed powder of $ZrO_2$-$Y_2O_3$-$Al_2O_3$ or $ZrO_2$-$Y_2O_3$-$CeO_2$-$Al_2O_3$. In these preparation methods, $ZrO_2$-$Y_2O_3$, $ZrO_2$-$Y_2O_3$-$CeO_2$, $ZrO_2$-$Y_2O_3$-$Al_2O_3$, $ZrO_2$-$Y_2O_3$-$CeO_2O_3$ each may be prepared in the form of mixed powder thereof or may be prepared by calcination of mixed powders thereof. Although 0.5–3.0 wt% $HfO_2$ is inevitably contained in the zirconia raw material, a part of $ZrO_2$ may be substituted for $HfO_2$ in the zirconia ceramic composition of the present invention.

DESCRIPTION OF THE PREFERRED EMBODIMENTS

EXAMPLE 1

A compound of $ZrO_2$-$Y_2O_3$ was precipitated by hydrolysis of aqueous salt solutions thereof. The precipitated compound was calcined at 900° C. to obtain zirconia powder of particle diameter less than 1 μm. The zirconia powder was added with powder of $Al_2O_3$ and MgO, ground by a pot mill and dried by spray to obtain a raw material consisting essentially of $ZrO_2$-$Y_2O_3$-$Al_2O_3$-MgO.

The raw material was preformed under pressure of 200 kg/cm$^2$ and shaped by Cold Isostatic Pressing into a rectangular plate of 60×60×8 (mm) under pressure of 3 ton/cm$^2$. The rectangular plate was fired by pressureless sintering at about 1400° C. for 5 hours and cut into a plurality of bar specimens each size of which is 3×4×40 (mm). Thus, the bar specimens were tested as follows.

(1) The bending strengths were measured by 4-point bending test with 10mm upper span and 30mm lower span at a cross-head speed 0.5mm/min using the bar specimens.

(2) For measurement of the acid resistances, the bar specimens were put into solution of 36 wt% HCl in a sealed container and retained in the solution at 150° C. for 200 hours. Thereafter, the weight of bar specimens was measured to calculate reduction of the weight per a unit area (mg/cm$^2$).

Figure 1:
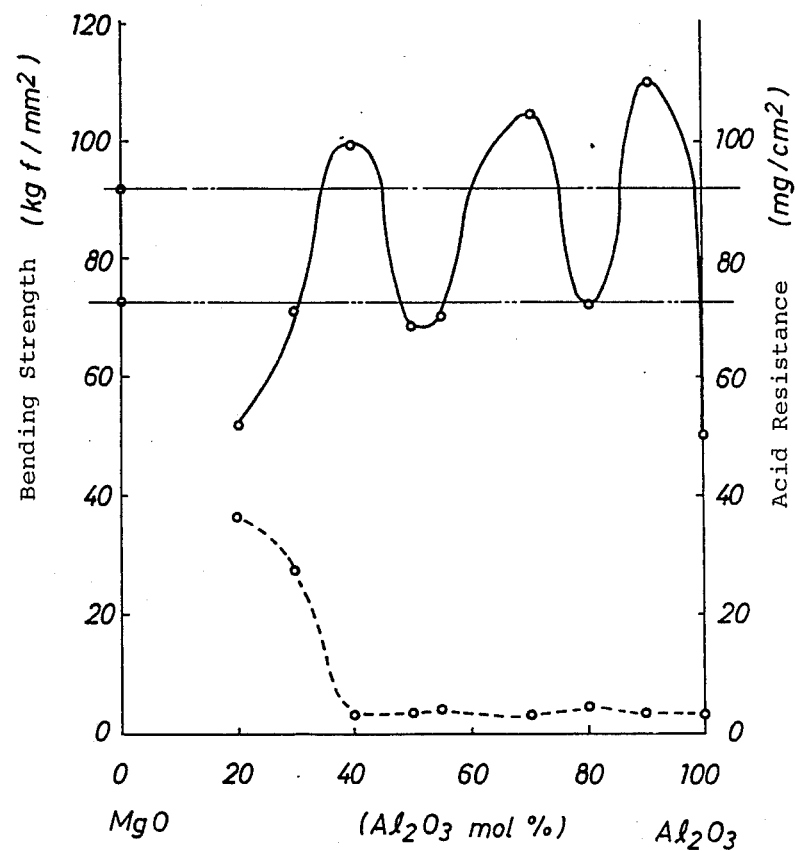
FIG. 1 is a graph illustrating bending strength and acid resistance of the zirconia ceramic composition in relation to molar ratios of $Al_2O_3$ and MgO in the case that the mixture ratio of aluminum and magnesium contents to the whole contents of the zirconia ceramic composition in terms of $Al_2O_3$ and MgO was determined in a constant value.
Figure 2:
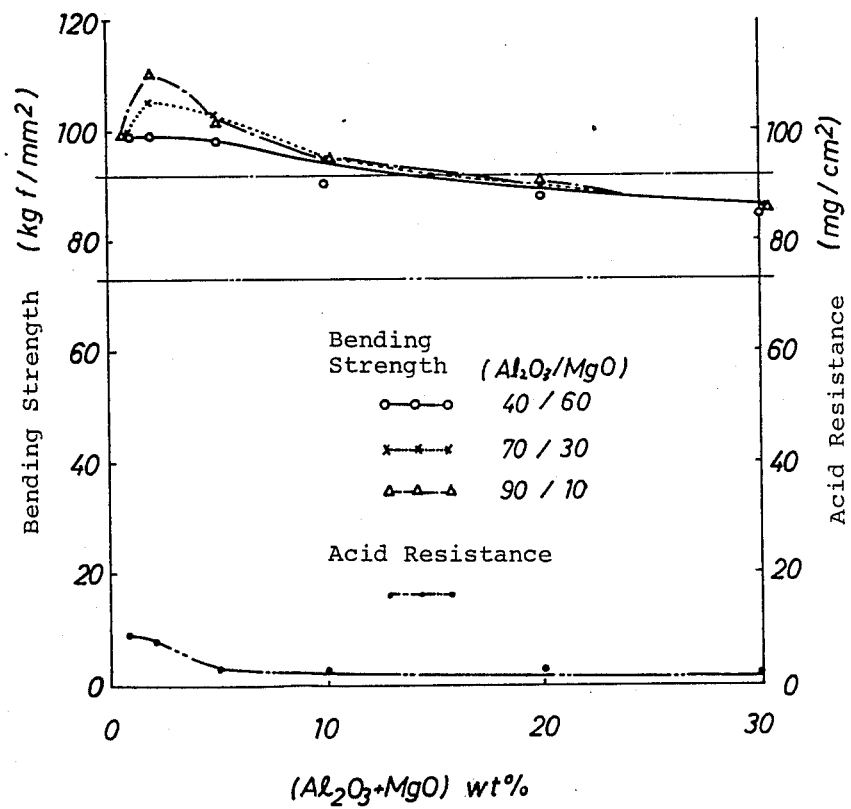
FIG. 2 is a graph illustrating bending strength and acid resistance of the zirconia ceramic composition in relation to weight ratios of $Al_2O_3$ and MgO to the whole contents of the zirconia ceramic composition in the case that the molar ratio between aluminum and magnesium contents was determined in a constant value.

The test results of the bar specimens are shown in Tables 1 and 2 attached hereto and illustrated in FIGS. 1 and 2. The test results of No. 1-No. 27 shown in Tables 1 and 2 was obtained in the case that a molar ratio between $Al_2O_3$ and MgO or an added amount of $Al_2O_3$ and MgO was varied in a condition where the molar ratio of a stabilizer $Y_2O_3$ to the compound $ZrO_2$ was determined in a constant value (3/97). The data of FIG. 1 was obtained by variation of the molar ratio between $Al_2O_3$ and MgO in a condition where the added amount of $Al_2O_3$ and MgO was determined in a constant value (2 wt%). The data of FIG. 2 was obtained by variation of the added amount of $Al_2O_3$ and MgO in a condition where the molar ratio between $Al_2O_3$ and MgO was determined in a constant value (40/60, 70/30, 90/10). In FIGS. 1 and 2, a dot-dash straight line indicates the bending strength and acid resistance of a bar specimen prepared without $Al_2O_3$-MgO. As is illustrated in FIGS. 1 and 2, the acid resistance of the bar specimens added with $Al_2O_3$ and MgO was noticeably enhanced in the case that the molar ratio between $Al_2O_3$ and MgO was determined more than 30/60, and the bending strength of the bar specimens was increased up to a peak value in the case that the molar ratio between $Al_2O_3$ and MgO was determined to be 40/60, 70/30 and 90/10, respectively. Particularly, the bending strength of the bar specimens was noticeably increased in the case that the molar ratio between $Al_2O_3$ and MgO was determined to be 35-45/65-55, 60-75/40-25, 85-99/15-1, respectively. In addition, the bending strength was increased in the case that the added amount of $Al_2O_3$ and MgO was determined to be less than 20 wt%, preferably less than 10 wt%.

The test results of No. 28–No. 43 shown in Table 2 were obtained in the case that the molar ratio between $Al_2O_3$ and MgO was varied in a condition where the molar ratio of a stabilizer $Y_2O_3$ to the compound $ZrO_2$ was determined in a constant value (1.5/98.5, 2/98, 5/95) and where the added amount of $Al_2O_3$ and MgO was determined in a constant value (2 wt%, 5 wt%). The test results of No. 28–No. 43 indicate that the bending strength and acid resistance of the bar specimens were enhanced in contrast with the bar specimen prepared without $Al_2O_3$ and MgO.

From the test results described above, it will be understood that the zirconia cermaic composition of the present invention is superior in bending strength and acid resistance and useful as mechanical structure materials. In example 1, $Al_2O_3$ and MgO were adapted to contain aluminum and magnesium contents into the compound of $ZrO_2$-$Y_2O_3$. The amount of the aluminum and magnesium contents is consistent with an amount of aluminum and magnesium contents in a ceramic composition ground in 44 μm after firing and measured by fluorescent X-ray analysis. For this reason, the amount of aluminum and magnesium contents in terms of $Al_2O_3$ and MgO is substantially consistent with the added amount of $Al_2O_3$ and MgO. In addition, it was found by fluorescent X-ray analysis that the following impurity is contained in the bar specimens:

less than 2.0 wt% $SiO_2$, less than 2.0 wt% $TiO_2$, less than 0.5 wt% CaO, less than 0.5 wt% $K_2O$, less than 0.5 wt% $Na_2O$ and less than 3.0 wt% $HfO_2$.

EXAMPLE 2

A compound of $ZrO_2$-$Y_2O_3$-$CeO_2$ was precipitated by hydrolysis of aqueous salt solutions thereof. The precipitated compound was calcined at 900° C. to obtain zirconia powder of particle diameter less than 1 μm. The zirconia powder was added with powder of $Al_2O_3$ and MgO, ground by a port mill and dried by spray to obtain a raw material consisting essentially of $ZrO_2$-$Y_2O_3$-$CeO_2$-$Al_2O_3$-MgO.

The raw material was preformed under pressure of 200 kg/cm$^2$ and shaped by Cold Isostatic Pressing into a rectangular plate of 60×60×8 (mm) under pressure of 3 ton/cm$^2$. The rectangular plate was fired by pressureless sintering at about 1400° C. for 5 hours and cut into a plurality of bar specimens each size of which is $3\times4\times40$ (mm). Thus, the bar specimens were tested as follows.

(1) The bending strengths were measured by 4-point bending test with 10mm upper span and 30mm lower span at a cross-head speed 0.5mm/min using the bar specimens.

(2) For measurement of the thermal deterioration, the bar specimens were put into hot water at 250° C. under vapor pressure of 39 kg/cm$^2$ in an autoclave and treated by heat for 50 hours. Thereafter, the rate of transformation from cubic structure into tetragonal structure and to monoclinic structure in the bar specimens were calculated as follows.

The bar specimens were mirror surface finished with diamond paste and applied to X-ray diffraction to measure integration intensity IM, IT, IC of diffraction peaks on the monoclinic crystal surface (11$\bar{1}$), the tetragonal crystal surface (111), and the cubic crystal surface thereby to calculate an amount of tetragonal and cubic contents $V_0=(IT+IC)/(IM+IT+IC)$. The bar specimens after heat treatment were further applied to X-ray diffraction to calculate an amount of tetragonal and cubic contents ($V_1$) in the same manner as described above. Thus, the rate of transformation $(\%)=(V_0-V_1)/V_0\times100$ was calculated on a basis of the calculated amounts of tetragonal and cubic contents $V_0$ and $V_1$.

Figure 3:
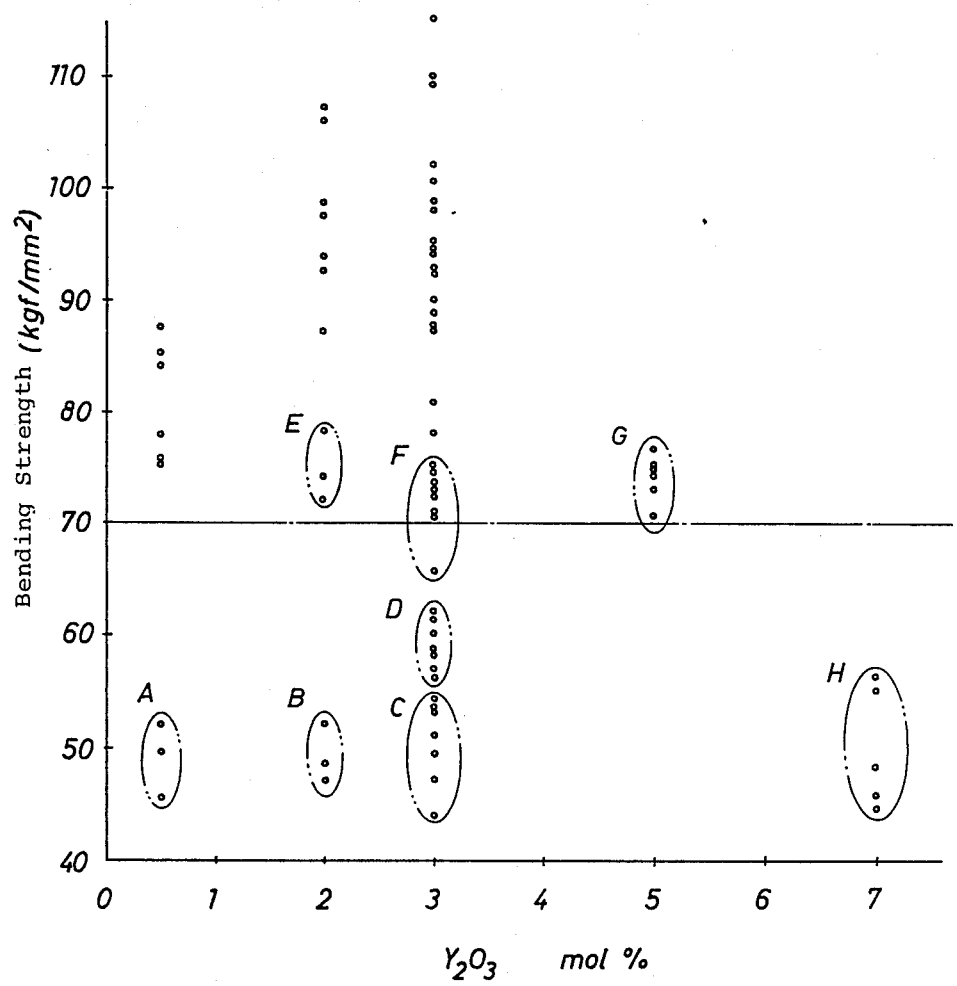
FIG. 3 is a graph illustrating bending strength of the zirconia ceramic composition in relation to a mixed amount (mol%) of $Y_2O_3$ in the composition.
Figure 4:
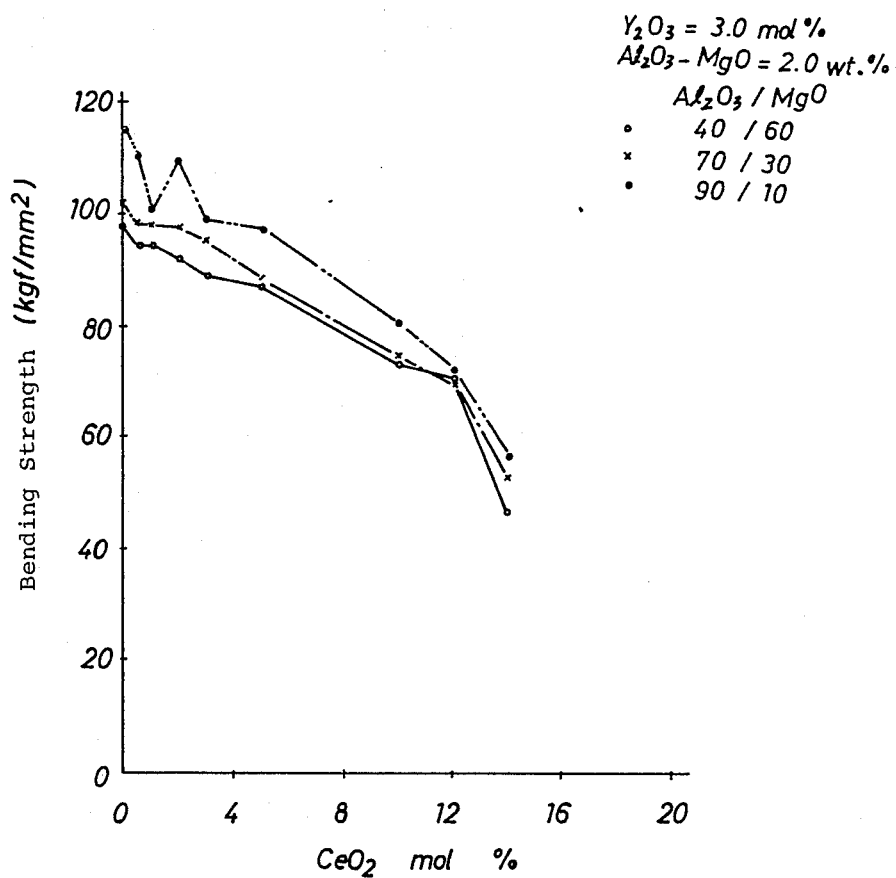
FIG. 4 is a graph illustrating bending strength of the zirconia ceramic composition in relation to a mixed amount (mol%) of $CeO_2$ in the composition.

The test results of the bar specimens are shown in Tables 3-11 attached hereto and illustrated in FIGS. 3-7. In the test results, the value of 70 kgf/mm$^2$ was defined as a standard value for determination of the bending strength, and the value of 25% was defined as a standard value for determination of the thermal stability. In FIG. 3, the specimens in eight groups A-H are plotted near or below the standard value 70 kgf/mm$^2$. The specimens in groups A-D were prepared to contain less than 82-85 mol% $ZrO_2$ and more than 15 mol% $Y_2O_3$ and $CeO_2$, the specimens in groups E and F to contain 85 mol% $ZrO_2$ and 15 mol% $Y_2O_3$ and $CeO_2$, the specimens in group G to contain 5 mol% $Y_2O_3$, and the specimens to group H to contain 7 mol% $Y_2O_3$. In FIG. 4 there is illustrated a relationship between a mixed amount of $CeO_2$ (mol%) in a zirconia ceramic composition containing 3 mol% $Y_2O_3$ and 2 wt% $Al_2O_3$ and MgO and bending strength of the same ceramic composition. In this illustration, it was found that the bending strengths are decreased in accordance with an increase of the mixed amount of $CeO_2$ and noticeably decreased by mixture of $CeO_2$ more than 12 mol%. From the test results described above, it was confirmed that a high strength zirconia ceramic composition can be obtained by a compound of $ZrO_2$ containing 0.5-5 mol% $Y_2O_3$, 0.5-12 mol% $CeO_2$, $Al_2O_3$ and MgO, provided that the total amount of $Y_2O_3$ and $CeO_2$ should be determined to be 1.0-15 mol%.

Figure 5:
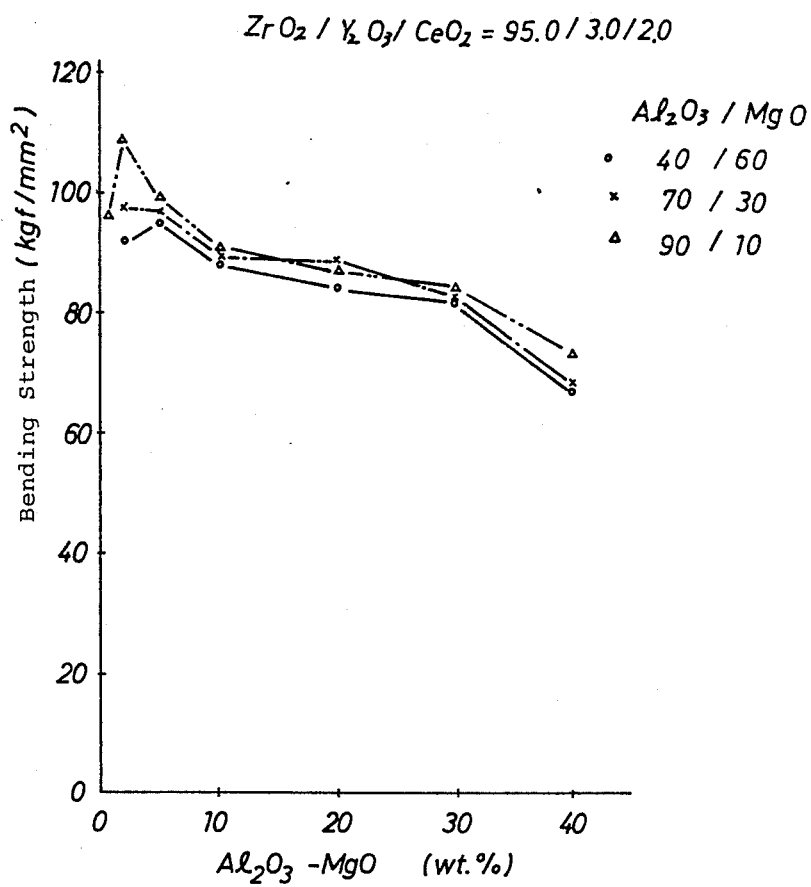
FIG. 5 is a graph illustrating bending strength of the zirconia ceramic composition in relation to a mixed amount (wt%) of aluminum and magnesium contents in terms of $Al_2O_3$ and MgO in the composition.
Figure 6:
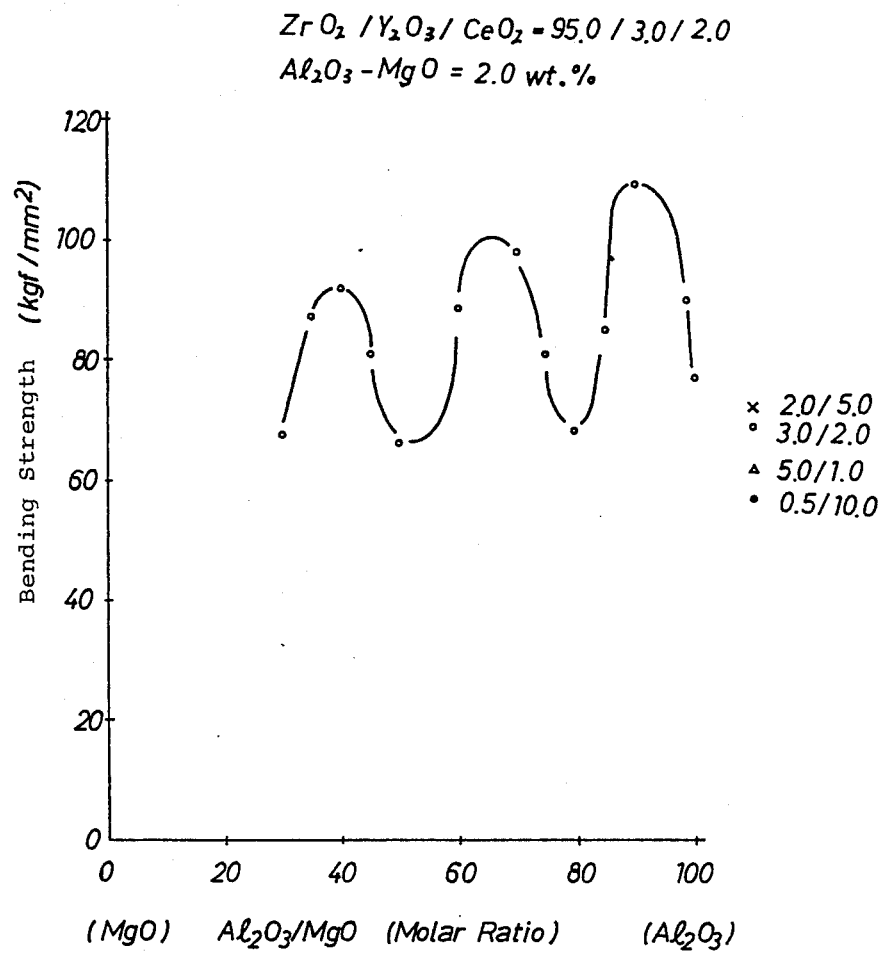
FIG. 6 is a graph illustrating bending strength of the zirconia ceramic composition in relation to a molar ratio of $Al_2O_3$ and MgO in the composition.

In FIG. 5 there is illustrated a relationship between a mixed amount (wt%) of $Al_2O_3$ and MgO in a zirconia ceramic composition containing 3 mol% $Y_2O_3$ and 2 mol% $CeO_2$ and bending strength of the same ceramic composition. In this case, the mixed amount (wt%) of aluminum and magnesium contents was determined in terms of $Al_2O_3$ and MgO. In this illustration, it was found that the bending strengths are decreased in accordance with an increase of the mixed amount of $Al_2O_3$ and MgO and noticeably decreased by mixture of $Al_2O_3$ and MgO more than 30 wt%. In FIG. 6 there is illustrated a relationship between a molar ratio $Al_2O_3$/MgO in a zirconia ceramic composition containing 3 mol% $Y_2O_3$, 2 mol% $CeO_2$ and 2 wt% $Al_2O_3$ and MgO and bending strength of the same ceramic composition. In this illustration, it was found that each peak of the bending strengths is obtained by determination of the molar ratio $Al_2O_3$/MgO is 40/60, 70/30 or 90/10. Preferably, the molar ratio $Al_2O_3$/MgO should be determined in a extent of 35-45/65-55, 60-75/40-25 or 85-99/15-1. From the test results, it was confirmed that a high strength zirconia ceramic composition can be obtained by a compound a $ZrO_2$ containing less than 30 wt% $Al_2O_3$ and MgO at the molar ratio listed below.

(a) 35-45/65-55
(b) 60-75/40-25
(c) 85-99/15-1

Figure 7:
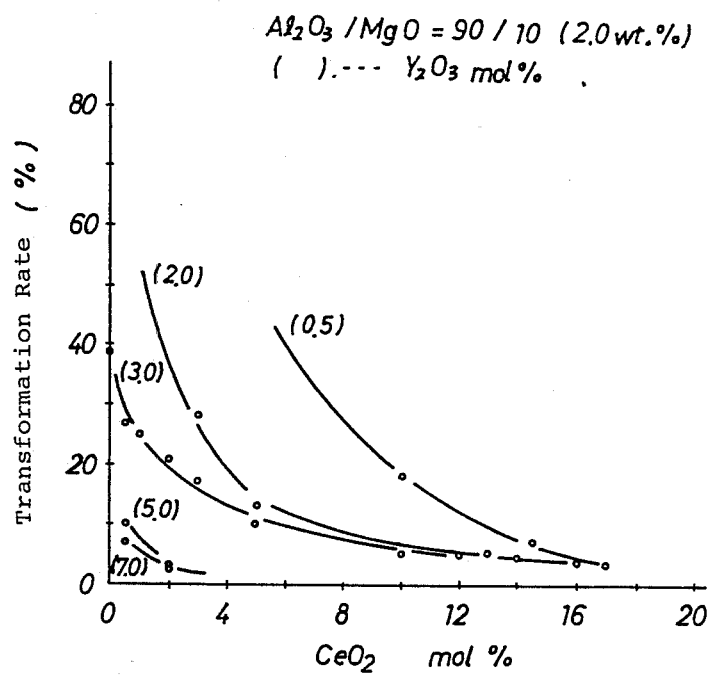
FIG. 7 is a graph illustrating the rate of transformation from cubic structure into tetragonal structure and to monoclinic structure in relation to a mixed amount (mol%) of $CeO_2$ and $Y_2O_3$ in the zirconia ceramic composition.

As is understood from the data of FIGS. 3-5, it was confirmed that the bending strength is noticeably increased in a zirconia ceramic composition containing 2 mol% $Y_2O_3$, less than 5 mol% $CeO_2$, 1-5 mol% $Al_2O_3$ a MgO. In FIG. 7 there is illustrated a relationship between mixed amounts (mol%) of $Y_2O_3$ and $CeO_2$ in a zirconia ceramic composition containing 2.0 wt% at a molar ratio 90/10 and the rate of transformation of the tetragonal structure and cubic structure in the ceramic composition. From the data of FIG. 7, it was confirmed that the rate of transformation is decreased in accordance with an increase of the mixed amounts of $Y_2O_3$ and $CeO_2$. This means that the thermal stability of the zirconia ceramic composition is greatly enhanced by an increase of the mixed amounts of $Y_2O_3$ and $CeO_2$.

EXAMPLE 3

Powders of $ZrO_2$-$Y_2O_3$ and $ZrO_2$-$Y_2O_3$-$CeO_2$ were prepared in the same manner as described in Example 1 added with aluminum and magnesium contents in the form of $Al(OH)_3$, $AlCl_3$, $Al(NO_3)_3$, $Al_2(C_2O_4)_3$ $Mg(OH)_2$, $MgCl_2$, $Mg(NO_3)_2$, $MgC_2O_4$, $MgCO_3$ or the like, ground by a pot mill and dried by spray to obtain a raw material consisting essentially of $ZrO_2$-$Y_2O_3$ and the aluminum and magnesium contents and a raw material consisting essentially of $ZrO_2$-$Y_2O_3$-$CeO_2$ and the aluminum and magnesium contents.

Using the raw materials, various bar specimens were prepared in the same manner as described in Example 1 and tested in the same manner as described in Example 1. The test results of the bar specimens are shown in Tables 12-15 attached hereto. From the data of Tables 12-15, it was confirmed that the use of aluminum and magnesium contents in the form of the above-described compounds is effective to obtain the same results as those in use of $Al_2O_3$-MgO.

EXAMPLE 4

(1) Sol-solution was prepared by hydrolysis of aqueous solution containing zirconium oxychloride added with yttrium chloride or yttrium chloride and cerium chloride. The sol-solution was added with $Al(OH)_3$ and $Mg(OH)_2$, treated by heat, ground and dried in the same manner as described in Example 1 to obtain a raw material.

(2) The sol-solution was added with $Al(OH)_3$ in such a manner that a molar ratio to MgO is determined to be 90/10 in terms of $Al_2O_3$. Powder obtained by heat treatment of the sol-solution was added with powder of MgO, ground and dried in the same manner as described in Example 1 to obtain a raw material.

Using the raw materials, various bar specimens were prepared in the same manner as described in Example 1 and tested in the same manner as described in Example 1. The test results of the bar specimens are shown in Table 16 attached hereto. From the data of Table 16, it was confirmed that the use of zirconium, yttrium and cerium ions in the form of aqueous salt solution is effective to obtain the same results as those in use of precipitated $ZrO_2$-$Y_2O_3$ or $ZrO_2$-$Y_2O_3$-$CeO_2$.

TABLE 1

| No | Molar Ratio ($Y_2O_3$/$ZrO_2$) | $Al_2O_3$/MgO Molar Ratio | Amount (wt %) | Bending Strength (kgf/mm²) | Acid Resistance (mg/cm²) |
|---|---|---|---|---|---|
| 1 | 3/97 | 20/80 | 2 | 52.0 | 36.4 |
| 2 | 3/97 | 30/70 | 2 | 71.2 | 27.5 |
| 3 | 3.97 | 40/60 | 2 | 99.4 | 3.0 |
| 4 | 3/97 | 50/50 | 2 | 69.2 | 3.6 |
| 5 | 3/97 | 55/45 | 2 | 70.4 | 4.0 |
| 6 | 3/97 | 70/30 | 2 | 105.2 | 3.1 |
| 7 | 3/97 | 80/20 | 2 | 72.3 | 4.5 |
| 8 | 3/97 | 90/10 | 2 | 110.5 | 3.5 |
| 9 | 3/97 | 100/0 | 2 | 50.1 | 3.2 |
| 10 | 3/97 | 40/60 | 1 | 98.7 | 4.5 |
| 11 | 3/97 | 40/60 | 5 | 98.2 | 2.7 |
| 12 | 3/97 | 40/60 | 10 | 90.5 | 2.7 |
| 13 | 3/97 | 40/60 | 20 | 87.8 | 2.6 |
| 14 | 3/97 | 40/60 | 30 | 84.5 | 2.5 |
| 15 | 3/97 | 70/30 | 1 | 99.5 | 4.5 |
| 16 | 3/97 | 70/30 | 5 | 103.0 | 3.0 |
| 17 | 3/97 | 70/30 | 10 | 95.2 | 2.9 |
| 18 | 3/97 | 70/30 | 20 | 89.8 | 2.9 |
| 19 | 3/97 | 70/30 | 30 | 84.8 | 2.6 |
| 20 | 3/97 | 90/10 | 1 | 99.2 | 5.1 |
| 21 | 3/97 | 90/10 | 5 | 102.0 | 3.1 |

TABLE 1-continued

| No | Molar Ratio ($Y_2O_3$/$ZrO_2$) | $Al_2O_3$/MgO Molar Ratio | Amount (wt %) | Bending Strength (kgf/mm²) | Acid Resistance (mg/cm²) |
|---|---|---|---|---|---|
| 22 | 3/97 | 90/10 | 10 | 95.4 | 3.1 |

TABLE 2

| No | Molar Ratio ($Y_2O_3$/$ZrO_2$) | $Al_2O_3$/MgO Molar Ratio | Amount (wt %) | Bending Strength (kgf/mm²) | Acid Resistance (mg/cm²) |
|---|---|---|---|---|---|
| 23 | 3/97 | 90/10 | 20 | 90.2 | 2.9 |
| 24 | 3/97 | 90/10 | 30 | 85.2 | 2.7 |
| 25 | 3/97 | 30/70 | 5 | 67.7 | 28.1 |
| 26 | 3/97 | 50/50 | 20 | 51.3 | 3.7 |
| 27 | 3/97 | — | 0 | 92.0 | 73.1 |
| 28 | 1.5/98.5 | 40/60 | 2 | 78.2 | 52.1 |
| 29 | 1.5/98.5 | 70/30 | 2 | 78.2 | 45.0 |
| 30 | 1.5/98.5 | 90/10 | 2 | 77.2 | 41.0 |
| 31 | 1.5/98.5 | — | 0 | 62.0 | 120.2 |
| 32 | 2/98 | 40/60 | 2 | 98.7 | 37.0 |
| 33 | 2/98 | 70/30 | 2 | 98.5 | 37.0 |
| 34 | 2/98 | 90/10 | 2 | 100.0 | 36.8 |
| 35 | 2/98 | 100/0 | 2 | 52.1 | 32.0 |
| 36 | 2/98 | 40/60 | 5 | 99.0 | 35.0 |
| 37 | 2/98 | 70/30 | 5 | 102.1 | 36.5 |
| 38 | 2/98 | 90/10 | 5 | 106.0 | 36.2 |
| 39 | 2/98 | — | 0 | 90.5 | 92.1 |
| 40 | 5/95 | 40/60 | 2 | 79.2 | 32.0 |
| 41 | 5/95 | 70/30 | 2 | 78.8 | 29.0 |
| 42 | 5/95 | 90/10 | 2 | 79.5 | 38.7 |
| 43 | 5/95 | — | 0 | 58.5 | 122.4 |

TABLE 3

| No | $ZrO_2$ (mol %) | $Y_2O_3$ (mol %) | $CeO_2$ (mol %) | $Al_2O_3$/MgO (molar ratio) | $Al_2O_3$—MgO Amount (wt %) | Bending Strength (Kgf/mm²) | Transformation Rate (%) |
|---|---|---|---|---|---|---|---|
| 1 | 99.5 | 0.5 | 0 | 40/60 | 2 | — | Degradated |
| 2 | 89.5 | " | 10.0 | " | " | 75.5 | 21 |
| 3 | 85.0 | " | 14.5 | " | " | 84.5 | 7 |
| 4 | 82.5 | " | 17.0 | " | " | 45.0 | 4 |
| 5 | 99.5 | " | 0 | 70/30 | " | — | Degradated |
| 6 | 89.5 | " | 10.0 | " | " | 74.8 | 18 |
| 7 | 85.0 | " | 14.5 | " | " | 85.3 | 7 |
| 8 | 82.0 | " | 17.0 | " | " | 52.1 | 4 |
| 9 | 99.5 | " | 0 | 90/10 | " | — | Degradated |
| 10 | 89.5 | " | 10.0 | " | " | 78.3 | 18 |
| 11 | 85.0 | " | 14.5 | " | " | 87.5 | 7 |
| 12 | 82.5 | " | 17.0 | " | " | 49.8 | 3 |
| 13 | 98.0 | 2.0 | 0 | 40/60 | " | 98.7 | Degradated |
| 14 | 95.0 | " | 3.0 | " | " | 92.5 | 30 |
| 15 | 93.0 | " | 5.0 | " | " | 87.0 | 15 |
| 16 | 85.0 | " | 13.0 | " | " | 74.0 | 5 |
| 17 | 82.0 | " | 16.0 | " | " | 47.3 | 4 |
| 18 | 98.0 | " | 0 | 70/30 | " | 98.5 | Degradated |
| 19 | 95.0 | " | 3.0 | " | " | 93.7 | 27 |
| 20 | 93.0 | " | 5.0 | " | " | 97.5 | 15 |
| 21 | 85.0 | " | 13.0 | " | " | 72.1 | 4 |
| 22 | 82.0 | " | 16.0 | " | " | 48.5 | 4 |

TABLE 4

| No | $ZrO_2$ (mol %) | $Y_2O_3$ (mol %) | $CeO_2$ (mol %) | $Al_2O_3$/MgO (molar ratio) | $Al_2O_3$—MgO Amount (wt %) | Bending Strength (Kgf/mm²) | Transformation Rate (%) |
|---|---|---|---|---|---|---|---|
| 23 | 98.0 | 2.0 | 0 | 90/10 | 2 | 106.0 | |
| 24 | 95.0 | " | 3.0 | " | " | 97.3 | 28 |
| 25 | 93.0 | " | 5.0 | " | " | 107.0 | 13 |
| 26 | 85.0 | " | 13.0 | " | " | 78.3 | 5 |
| 27 | 82.0 | " | 16.0 | " | " | 52.1 | 4 |
| 28 | 97.0 | 3.0 | 0 | 40/60 | " | 98.7 | 39 |
| 29 | 96.5 | " | 0.5 | " | " | 94.2 | 31 |
| 30 | 96.0 | " | 1.0 | " | " | 94.5 | 22 |
| 31 | 95.0 | " | 2.0 | " | " | 92.1 | 17 |

TABLE 4-continued

| | Composition | | | | | | |
|---|---|---|---|---|---|---|---|
| | | | | Al₂O₃—MgO | | Bending | Trans- |
| | ZrO₂ | Y₂O₃ | CeO₂ | Al₂O₃/MgO | Amount | Strength | formation |
| No | (mol %) | (mol %) | (mol %) | (molar ratio) | (wt %) | (Kgf/mm²) | Rate (%) |
| 32 | 94.0 | " | 3.0 | " | " | 89.9 | 14 |
| 33 | 92.0 | " | 5.0 | " | " | 87.4 | 8 |
| 34 | 87.0 | " | 10.0 | " | " | 73.1 | 4 |
| 35 | 85.0 | " | 12.0 | " | " | 71.1 | 4 |
| 36 | 83.0 | " | 14.0 | " | " | 47.0 | 4 |
| 37 | 97.0 | " | 0 | 70/30 | " | 102.1 | 37 |
| 38 | 96.5 | " | 0.5 | " | " | 98.5 | 30 |
| 39 | 96.0 | " | 1.0 | " | " | 97.8 | 24 |
| 40 | 95.0 | " | 2.0 | " | " | 97.8 | 18 |
| 41 | 94.0 | " | 3.0 | " | " | 95.3 | 15 |
| 42 | 92.0 | " | 5.0 | " | " | 89.0 | 8 |
| 43 | 87.0 | " | 10.0 | " | " | 75.2 | 5 |

TABLE 5

| | Composition | | | | | | |
|---|---|---|---|---|---|---|---|
| | | | | Al₂O₃—MgO | | Bending | Trans- |
| | ZrO₂ | Y₂O₃ | CeO₂ | Al₂O₃/MgO | Amount | Strength | formation |
| No | (mol %) | (mol %) | (mol %) | (molar ratio) | (wt %) | (Kgf/mm²) | Rate (%) |
| 44 | 85.0 | 3.0 | 12.0 | 70/30 | 2 | 70.1 | 4 |
| 45 | 83.0 | " | 14.0 | " | " | 53.4 | 4 |
| 46 | 97.0 | " | 0 | 90/10 | " | 115.0 | 39 |
| 47 | 96.5 | " | 0.5 | " | " | 110.2 | 27 |
| 48 | 96.0 | " | 1.0 | " | " | 100.5 | 25 |
| 49 | 95.0 | " | 2.0 | " | " | 109.4 | 21 |
| 50 | 94.0 | " | 3.0 | " | " | 98.7 | 17 |
| 51 | 92.0 | " | 5.0 | " | " | 97.2 | 10 |
| 52 | 87.0 | " | 10.0 | " | " | 80.5 | 5 |
| 53 | 85.0 | " | 12.0 | " | " | 72.1 | 5 |
| 54 | 83.0 | " | 14.0 | " | " | 57.2 | 4 |
| 55 | 94.5 | 5.0 | 0.5 | 40/60 | " | 73.2 | 12 |
| 56 | 93.0 | " | 2.0 | " | " | 70.5 | 3 |
| 57 | 94.5 | " | 0.5 | 70/30 | " | 74.2 | 11 |
| 58 | 93.0 | " | 2.0 | " | " | 74.7 | 3 |
| 59 | 94.5 | " | 0.5 | 90/10 | " | 76.2 | 10 |
| 60 | 93.0 | " | 2.0 | " | " | 75.3 | 3 |
| 61 | 92.5 | 7.0 | 0.5 | 40/60 | " | 56.2 | 7 |
| 62 | 91.0 | " | 2.0 | " | " | 44.5 | 3 |
| 63 | 92.5 | " | 0.5 | 70/30 | " | 55.3 | 7 |
| 64 | 91.0 | " | 2.0 | " | " | 45.5 | 3 |
| 65 | 92.5 | " | 0.5 | 90/10 | " | 56.4 | 7 |

TABLE 6

| | Composition | | | | | | |
|---|---|---|---|---|---|---|---|
| | | | | Al₂O₃—MgO | | Bending | Trans- |
| | ZrO₂ | Y₂O₃ | CeO₂ | Al₂O₃/MgO | Amount | Strength | formation |
| No | (mol %) | (mol %) | (mol %) | (molar ratio) | (wt %) | (Kgf/mm²) | Rate (%) |
| 66 | 91.0 | 7.0 | 2.0 | 90/10 | 2 | 48.2 | 3 |
| 67 | 97.0 | 3.0 | 0 | 40/60 | 1 | 98.7 | 42 |
| 68 | 95.0 | " | 2.0 | " | " | 92.8 | 25 |
| 69 | 94.0 | " | 3.0 | " | " | 95.2 | 19 |
| 70 | 92.0 | " | 5.0 | " | " | 87.1 | 9 |
| 71 | 85.0 | " | 12.0 | " | " | 72.3 | 5 |
| 72 | 83.0 | " | 14.0 | " | " | 54.2 | 4 |
| 73 | 97.0 | " | 0 | 70/30 | " | 99.5 | 41 |
| 74 | 95.0 | " | 2.0 | " | " | 92.1 | 24 |
| 75 | 94.0 | " | 3.0 | " | " | 92.4 | 19 |
| 76 | 92.0 | " | 5.0 | " | " | 91.2 | 7 |
| 77 | 85.0 | " | 12.0 | " | " | 71.5 | 5 |
| 78 | 83.0 | " | 14.0 | " | " | 53.1 | 5 |
| 79 | 97.0 | " | 0 | 90/10 | " | 99.2 | 39 |
| 80 | 95.0 | " | 2.0 | " | " | 96.5 | 24 |
| 81 | 94.0 | " | 3.0 | " | " | 93.7 | 15 |
| 82 | 92.0 | " | 5.0 | " | " | 89.0 | 7 |
| 83 | 85.0 | " | 12.0 | " | " | 73.2 | 5 |
| 84 | 83.0 | " | 14.0 | " | " | 58.5 | 5 |
| 85 | 97.0 | " | 0 | 40/60 | 5 | 98.2 | 32 |
| 86 | 95.0 | " | 2.0 | " | " | 95.6 | 20 |

TABLE 7

| No | ZrO$_2$ (mol %) | Y$_2$O$_3$ (mol %) | CeO$_2$ (mol %) | Al$_2$O$_3$/MgO (molar ratio) | Amount (wt %) | Bending Strength (Kgf/mm$^2$) | Transformation Rate (%) |
|---|---|---|---|---|---|---|---|
| 87  | 94.0 | 3.0 | 3.0  | 40/60 | 5  | 93.4  | 11 |
| 88  | 92.0 | "   | 5.0  | "     | "  | 85.1  | 9  |
| 89  | 85.0 | "   | 12.0 | "     | "  | 70.2  | 5  |
| 90  | 83.0 | "   | 14.0 | "     | "  | 60.0  | 4  |
| 91  | 97.0 | "   | 0    | 70/30 | "  | 103.0 | 30 |
| 92  | 95.0 | "   | 2.0  | "     | "  | 97.3  | 23 |
| 93  | 94.0 | "   | 3.0  | "     | "  | 95.2  | 10 |
| 94  | 92.0 | "   | 5.0  | "     | "  | 90.0  | 8  |
| 95  | 85.0 | "   | 12.0 | "     | "  | 74.1  | 5  |
| 96  | 83.0 | "   | 14.0 | "     | "  | 58.0  | 4  |
| 97  | 97.0 | "   | 0    | 90/10 | "  | 102.0 | 32 |
| 98  | 95.0 | "   | 2.0  | "     | "  | 100.3 | 23 |
| 99  | 94.0 | "   | 3.0  | "     | "  | 98.6  | 12 |
| 100 | 92.0 | "   | 5.0  | "     | "  | 89.4  | 8  |
| 101 | 85.0 | "   | 12.0 | "     | "  | 78.5  | 5  |
| 102 | 83.0 | "   | 14.0 | "     | "  | 61.0  | 4  |
| 103 | 97.0 | "   | 0    | 40/60 | 10 | 90.5  | 25 |
| 104 | 95.0 | "   | 2.0  | "     | "  | 88.2  | 17 |
| 105 | 92.0 | "   | 5.0  | "     | "  | 72.1  | 5  |
| 106 | 85.0 | "   | 12.0 | "     | "  | 67.5  | 4  |
| 107 | 83.0 | "   | 14.0 | "     | "  | 44.3  | 4  |
| 108 | 97.0 | "   | 0    | 70/30 | "  | 95.2  | 25 |
| 109 | 95.0 | "   | 2.0  | "     | "  | 89.5  | 14 |

TABLE 8

| No | ZrO$_2$ (mol %) | Y$_2$O$_3$ (mol %) | CeO$_2$ (mol %) | Al$_2$O$_3$/MgO (molar ratio) | Amount (wt %) | Bending Strength (Kgf/mm$^2$) | Transformation Rate (%) |
|---|---|---|---|---|---|---|---|
| 110 | 92.0 | 3.0 | 5.0  | 70/30 | 10 | 72.1 | 4  |
| 111 | 85.0 | "   | 12.0 | "     | "  | 65.5 | 4  |
| 112 | 83.0 | "   | 14.0 | "     | "  | 50.9 | 3  |
| 113 | 97.0 | "   | 0    | 90/10 | "  | 95.4 | 24 |
| 114 | 95.0 | "   | 2    | "     | "  | 91.3 | 12 |
| 115 | 92.0 | "   | 5.0  | "     | "  | 80.2 | 6  |
| 116 | 85.0 | "   | 12.0 | "     | "  | 74.4 | 4  |
| 117 | 83.0 | "   | 14.0 | "     | "  | 57.5 | 4  |
| 118 | 97.0 | "   | 0    | 40/60 | 20 | 87.8 | 20 |
| 119 | 95.0 | "   | 2.0  | "     | "  | 84.5 | 12 |
| 120 | 92.0 | "   | 5.0  | "     | "  | 74.7 | 5  |
| 121 | 85.0 | "   | 12.0 | "     | "  | 58.2 | 3  |
| 122 | 83.0 | "   | 14.0 | "     | "  | 60.0 | 3  |
| 123 | 97.0 | "   | 0    | 70/30 | "  | 89.8 | 21 |
| 124 | 95.0 | "   | 2.0  | "     | "  | 89.2 | 14 |
| 125 | 92.0 | "   | 5.0  | "     | "  | 72.2 | 4  |
| 126 | 85.0 | "   | 12.0 | "     | "  | 60.3 | 3  |
| 127 | 83.0 | "   | 14.0 | "     | "  | 54.1 | 4  |
| 128 | 97.0 | "   | 0    | 90/10 | "  | 90.2 | 18 |
| 129 | 95.0 | "   | 2.0  | "     | "  | 87.2 | 10 |
| 130 | 92.0 | "   | 5.0  | "     | "  | 74.2 | 5  |
| 131 | 85.0 | "   | 12.0 | "     | "  | 57.6 | 4  |

TABLE 9

| No | ZrO$_2$ (mol %) | Y$_2$O$_3$ (mol %) | CeO$_2$ (mol %) | Al$_2$O$_3$/MgO (molar ratio) | Amount (wt %) | Bending Strength (Kgf/mm$^2$) | Transformation Rate (%) |
|---|---|---|---|---|---|---|---|
| 132 | 83.0 | 3.0 | 14.0 | 90/10 | 20 | 56.1 | 4  |
| 133 | 97.0 | "   | 0    | 40/60 | 30 | 84.5 | 17 |
| 134 | 95.0 | "   | 2.0  | "     | "  | 82.1 | 12 |
| 135 | 92.0 | "   | 5.0  | "     | "  | 69.2 | 5  |
| 136 | 85.0 | "   | 12.0 | "     | "  | 62.1 | 3  |
| 137 | 83.0 | "   | 14.0 | "     | "  | 49.5 | 3  |
| 138 | 97.0 | "   | 0    | 70/30 | "  | 84.8 | 18 |
| 139 | 95.0 | "   | 2.0  | "     | "  | 82.1 | 14 |
| 140 | 92.0 | "   | 5.0  | "     | "  | 70.3 | 3  |
| 141 | 85.0 | "   | 12.0 | "     | "  | 64.3 | 3  |
| 142 | 83.0 | "   | 14.0 | "     | "  | 51.2 | 3  |
| 143 | 97.0 | "   | 0    | 90/10 | "  | 86.4 | 18 |
| 144 | 95.0 | "   | 2.0  | "     | "  | 84.2 | 9  |
| 145 | 92.0 | "   | 5.0  | "     | "  | 74.7 | 4  |

TABLE 9-continued

| No | ZrO$_2$ (mol %) | Y$_2$O$_3$ (mol %) | CeO$_2$ (mol %) | Al$_2$O$_3$/MgO (molar ratio) | Amount (wt %) | Bending Strength (Kgf/mm$^2$) | Transformation Rate (%) |
|---|---|---|---|---|---|---|---|
| 146 | 85.0 | " | 12.0 | " | " | 67.4 | 3 |
| 147 | 83.0 | " | 14.0 | " | " | 52.5 | 3 |
| 148 | 97.0 | " | 0 | 40/60 | 40 | 72.2 | 15 |
| 149 | 95.0 | " | 2.0 | " | " | 67.2 | 10 |
| 150 | 92.0 | " | 5.0 | " | " | 56.8 | 5 |
| 151 | 85.0 | " | 12.0 | " | " | 55.0 | 4 |
| 152 | 83.0 | " | 14.0 | " | " | 47.0 | 3 |
| 153 | 97.0 | " | 0 | 70/30 | " | 73.4 | 13 |

TABLE 10

| No | ZrO$_2$ (mol %) | Y$_2$O$_3$ (mol %) | CeO$_2$ (mol %) | Al$_2$O$_3$/MgO (molar ratio) | Amount (wt %) | Bending Strength (Kgf/mm$^2$) | Transformation Rate (%) |
|---|---|---|---|---|---|---|---|
| 154 | 95.0 | 3.0 | 2.0 | 70/30 | 40 | 68.5 | 10 |
| 155 | 92.0 | " | 5.0 | " | " | 58.2 | 5 |
| 156 | 85.0 | " | 12.0 | " | " | 54.2 | 3 |
| 157 | 83.0 | " | 14.0 | " | " | 48.7 | 3 |
| 158 | 97.0 | " | 0 | 90/10 | " | 76.7 | 16 |
| 159 | 95.0 | " | 2.0 | " | " | 74.2 | 12 |
| 160 | 92.0 | " | 5.0 | " | " | 65.2 | 5 |
| 161 | 85.0 | " | 12.0 | " | " | 58.5 | 3 |
| 162 | 83.0 | " | 14.0 | " | " | 49.2 | 3 |
| 163 | 95.0 | " | 2.0 | 30/70 | 2.0 | 67.5 | 32 |
| 164 | " | " | " | 35/65 | " | 86.8 | 24 |
| 165 | " | " | " | 45/55 | " | 80.7 | 13 |
| 166 | " | " | " | 50/50 | " | 65.8 | 10 |
| 167 | " | " | " | 60/40 | " | 88.7 | 12 |
| 168 | " | " | " | 75/25 | " | 81.2 | 12 |
| 169 | " | " | " | 80/20 | " | 68.2 | 12 |
| 170 | " | " | " | 85/15 | " | 84.9 | 14 |
| 171 | " | " | " | 99/1 | " | 89.5 | 10 |
| 172 | " | " | " | 100/0 | " | 77.0 | 10 |
| 173 | 85.0 | 0.5 | 10.0 | — | 0 | 57.2 | 25 |
| 174 | 93.5 | 2.0 | 5.0 | — | " | 72.0 | 13 |

TABLE 11

| No | ZrO$_2$ (mol %) | Y$_2$O$_3$ (mol %) | CeO$_2$ (mol %) | Al$_2$O$_3$/MgO (molar ratio) | Amount (wt %) | Bending Strength (Kgf/mm$^2$) | Transformation Rate (%) |
|---|---|---|---|---|---|---|---|
| 175 | 95.0 | 3.0 | 2.0 | — | 0 | 68.7 | 23 |
| 176 | 94.0 | 5.0 | 1.0 | — | " | 62.1 | 4 |

TABLE 12

| No | ZrO$_2$ (mol %) | Y$_2$O$_3$ (mol %) | CeO$_2$ (mol %) | Al compound | Mg compound | Al$_2$O$_3$/MgO (molar ratio) | Amount (wt %) | Bending Strength (Kgf/mm$^2$) | Acid Resistance (mg/cm$^2$) |
|---|---|---|---|---|---|---|---|---|---|
| 1 | 97.0 | 3.0 | 0 | Al(OH)$_3$ | Mg(OH)$_2$ | 40/60 | 2.0 | 100.5 | 3.2 |
| 2 | " | " | " | " | " | " | 5.0 | 105.1 | 2.5 |
| 3 | " | " | " | " | " | " | 20.0 | 92.1 | 2.1 |
| 4 | " | " | " | " | " | " | 30.0 | 85.2 | 2.5 |
| 5 | " | " | " | " | " | " | 40.0 | 65.2 | 2.9 |
| 6 | " | " | " | " | " | 70/30 | 2.0 | 105.2 | 3.0 |
| 7 | " | " | " | " | " | " | 5.0 | 109.2 | 2.1 |
| 8 | " | " | " | " | " | " | 20.0 | 93.1 | 2.1 |
| 9 | " | " | " | " | " | " | 30.0 | 87.8 | 2.5 |
| 10 | " | " | " | " | " | " | 40.0 | 68.3 | 3.2 |
| 11 | " | " | " | " | " | 90/10 | 2.0 | 125.0 | 2.5 |
| 12 | " | " | " | " | " | " | 5.0 | 115.0 | 3.1 |
| 13 | " | " | " | " | " | " | 20.0 | 95.0 | 3.1 |
| 14 | " | " | " | " | " | " | 30.0 | 90.0 | 2.5 |
| 15 | " | " | " | " | " | " | 40.0 | 75.7 | 2.8 |
| 16 | 95.0 | 5.0 | " | AlCl$_3$ | MgCl$_2$ | 40/60 | 2.0 | 78.2 | 30.0 |
| 17 | " | " | " | " | " | 70/30 | " | 76.5 | 25.3 |
| 18 | " | " | " | " | " | 90/10 | " | 78.2 | 27.5 |
| 19 | 97.0 | 3.0 | " | " | " | 40/60 | " | 98.5 | 3.2 |

TABLE 12-continued

| | Composition | | | | | | Bending Strength (Kgf/mm²) | Acid Resistance (mg/cm²) |
|---|---|---|---|---|---|---|---|---|
| | ZrO₂ | Y₂O₃ | CeO₂ | Addition | | Al₂O₃—MgO | | |
| | | | | | | Al₂O₃/MgO | Amount | |
| No | (mol %) | (mol %) | (mol %) | Al compound | Mg compound | (molar ratio) | (wt %) | (Kgf/mm²) | (mg/cm²) |
| 20 | " | " | " | " | " | " | 5.0 | 97.9 | 3.0 |
| 21 | " | " | " | " | " | 70/30 | 2.0 | 110.5 | 3.4 |
| 22 | " | " | " | " | " | " | 5.0 | 109.5 | 2.2 |

TABLE 13

| | Composition | | | | | Al₂O₃—MgO | | Bending Strength | Acid Resistance |
|---|---|---|---|---|---|---|---|---|---|
| | ZrO₂ | Y₂O₃ | CeO₂ | Addition | | Al₂O₃/MgO | Amount | | |
| No | (mol %) | (mol %) | (mol %) | Al compound | Mg compound | (molar ratio) | (wt %) | (Kgf/mm²) | (mg/cm²) |
| 23 | 97.0 | 3.0 | 0 | AlCl₃ | MgCl₂ | 90/10 | 2.0 | 119.2 | 2.5 |
| 24 | " | " | " | " | " | " | 5.0 | 108.2 | 2.5 |
| 25 | " | " | " | Al(OH)₃ | " | 40/60 | 2.0 | 107.2 | 2.8 |
| 26 | " | " | " | " | " | 70/30 | " | 118.5 | 2.5 |
| 27 | " | " | " | " | " | 90/10 | " | 119.5 | 2.5 |
| 28 | " | " | " | Al(NO₃)₃ | Mg(NO₃)₂ | " | " | 108.2 | 2.1 |
| 29 | " | " | " | Al₂(C₂O₄)₃ | MgC₂O₄ | " | " | 122.7 | 2.2 |
| 30 | " | " | " | Al(NO₃)₃ | MgC₂O₄ | " | " | 105.6 | 2.5 |
| 31 | " | " | " | Al(OH)₃ | MgCO₃ | " | " | | |
| 32 | " | " | " | " | Mg(OH)₂ | 30/70 | " | 72.2 | 32.1 |
| 33 | " | " | " | " | " | 50/50 | " | 65.3 | 3.6 |
| 34 | " | " | " | " | " | 80/20 | " | 60.2 | 3.2 |
| 35 | " | " | " | " | — | 100/0 | " | 72.3 | 4.5 |
| 36 | " | " | " | AlCl₃ | MgCl₂ | 30/70 | " | 68.5 | 40.3 |
| 37 | " | " | " | " | " | 50/50 | " | 62.1 | 4.2 |
| 38 | " | " | " | " | " | 80/20 | " | 63.4 | 3.2 |
| 39 | " | " | " | " | — | 100/0 | " | 68.5 | 3.5 |
| 40 | " | " | " | Al(NO₃)₃ | Mg(NO₃)₂ | 50/50 | " | 65.1 | 4.2 |
| 41 | " | " | " | Al(OH)₃ | MgCO₃ | " | " | 64.2 | 3.5 |
| 42 | 95.0 | " | 2.0 | Al(OH)₃ | Mg(OH)₂ | 40/60 | " | 93.2 | — |

TABLE 14

| | Composition | | | | | Al₂O₃—MgO | | Bending Strength | Acid Resistance |
|---|---|---|---|---|---|---|---|---|---|
| | ZrO₂ | Y₂O₃ | CeO₂ | Addition | | Al₂O₃/MgO | Amount | | |
| No | (mol %) | (mol %) | (mol %) | Al compound | Mg compound | (molar ratio) | (wt %) | (Kgf/mm²) | (mg/cm²) |
| 43 | 95.0 | 3.0 | 2.0 | Al(OH)₃ | Mg(OH)₂ | 40/60 | 5.0 | 92.1 | 15 |
| 44 | " | " | " | " | " | " | 20.0 | 86.5 | 10 |
| 45 | " | " | " | " | " | " | 30.0 | 87.1 | 12 |
| 46 | " | " | " | " | " | " | 40.0 | 58.8 | 4 |
| 47 | " | " | " | " | " | 70/30 | 2.0 | 101.2 | 35 |
| 48 | " | " | " | " | " | " | 5.0 | 97.5 | 25 |
| 49 | " | " | " | " | " | " | 20.0 | 92.1 | 10 |
| 50 | " | " | " | " | " | " | 30.0 | 83.2 | 10 |
| 51 | " | " | " | " | " | " | 40.0 | 60.2 | 5 |
| 52 | " | " | " | " | " | 90/10 | 2.0 | 112.1 | 21 |
| 53 | " | " | " | " | " | " | 5.0 | 105.2 | 17 |
| 54 | " | " | " | " | " | " | 20.0 | 92.7 | 12 |
| 55 | " | " | " | " | " | " | 30.0 | 84.0 | 10 |
| 56 | " | " | " | " | " | " | 40.0 | 64.8 | 6 |
| 57 | 92.0 | " | 5.0 | " | " | 40/60 | 2.0 | 89.5 | 8 |
| 58 | " | " | " | " | " | 70/30 | " | 92.1 | 5 |
| 59 | " | " | " | " | " | 90/10 | " | 96.5 | 8 |
| 60 | 95.0 | 2.0 | " | AlCl₃ | MgCl₂ | 40/60 | 2.0 | 90.5 | 15 |
| 61 | " | " | " | " | " | " | 5.0 | 89.3 | 15 |
| 62 | " | " | " | " | " | 70/30 | 2.0 | 99.8 | 14 |
| 63 | " | " | " | " | " | " | 5.0 | 98.2 | 18 |

TABLE 15

| | Composition | | | | | Al₂O₃—MgO | | Bending Strength | Acid Resistance |
|---|---|---|---|---|---|---|---|---|---|
| | ZrO₂ | Y₂O₃ | CeO₂ | Addition | | Al₂O₃/MgO | Amount | | |
| No | (mol %) | (mol %) | (mol %) | Al compound | Mg compound | (molar ratio) | (wt %) | (Kgf/mm²) | (mg/cm²) |
| 64 | 95.0 | 3.0 | 2.0 | AlCl₃ | MgCl₂ | 90/10 | 2.0 | 108.2 | 21 |
| 65 | " | " | " | " | " | " | 5.0 | 103.1 | 18 |
| 66 | " | " | " | Al(OH)₃ | " | 60/40 | 2.0 | 91.2 | 18 |
| 67 | " | " | " | " | " | 70/30 | " | 96.5 | 15 |
| 68 | " | " | " | " | " | 90/10 | " | 105.0 | 25 |

TABLE 15-continued

| No | Composition | | | | | $Al_2O_3$—MgO | | Bending Strength ($Kgf/mm^2$) | Acid Resistance ($mg/cm^2$) |
|---|---|---|---|---|---|---|---|---|---|
| | $ZrO_2$ (mol %) | $Y_2O_3$ (mol %) | $CeO_2$ (mol %) | Addition | | $Al_2O_3$/MgO (molar ratio) | Amount (wt %) | | |
| | | | | Al compound | Mg compound | | | | |
| 69 | " | " | " | $Al(NO_3)_3$ | $Mg(NO_3)_2$ | " | " | 98.4 | 18 |
| 70 | " | " | " | $Al_2(C_2O_4)_3$ | $MgC_2O_4$ | " | " | 110.3 | 15 |
| 71 | " | " | " | $Al(NO_3)_3$ | $MgC_2O_4$ | " | " | 108.2 | 15 |
| 72 | " | " | " | $Al(OH)_3$ | $MgCO_3$ | " | " | 98.5 | 20 |
| 73 | " | " | " | " | $Mg(OH)_2$ | 30/70 | " | 65.2 | 37 |
| 74 | " | " | " | " | " | 50/50 | " | 62.1 | 10 |
| 75 | " | " | " | " | " | 80/20 | " | 65.3 | 12 |
| 76 | " | " | " | " | — | 100/0 | " | 69.1 | 9 |
| 77 | " | " | " | $AlCl_3$ | $MgCl_2$ | 30/70 | " | 64.4 | 34 |
| 78 | " | " | " | " | " | 50/50 | " | 67.1 | 15 |
| 79 | " | " | " | " | " | 80/20 | " | 63.7 | 12 |
| 80 | " | " | " | " | — | 100/0 | " | 68.3 | 14 |
| 81 | " | " | " | $Al(NO_3)_3$ | $Mg(NO_3)_2$ | 50/50 | " | 67.2 | 21 |
| 82 | " | " | " | $Al(OH)_3$ | $MgCO_3$ | " | " | 59.8 | 18 |

TABLE 16

| No | Composition | | | | | Bending Strength ($Kgf/mm^2$) | Acid Resistance ($mg/cm^2$) | Transformation Rate (%) |
|---|---|---|---|---|---|---|---|---|
| | $ZrO_2$ (mol %) | $Y_2O_3$ (mol %) | $CeO_2$ (mol %) | $Al_2O_3$—MgO | | | | |
| | | | | $Al_2O_3$/MgO (molar ratio) | Amount (wt %) | | | |
| 1 | 97.0 | 3.0 | 0 | 40/60 | 2.0 | 95.3 | 3.2 | — |
| 2 | " | " | " | 70/30 | " | 98.2 | 3.4 | — |
| 3 | " | " | " | 90/10 | " | 99.4 | 3.4 | — |
| 4 | 95.0 | " | 2.0 | 40/60 | " | 87.2 | — | 10 |
| 5 | " | " | " | 70/30 | " | 92.1 | — | 7 |
| 6 | " | " | " | 90/10 | " | 92.5 | — | 8 |
| 7 | 97.0 | " | 0 | " | " | 107.5 | 2.7 | — |
| 8 | " | " | " | " | " | 115.7 | 2.0 | — |
| 9 | 95.0 | " | 2.0 | " | " | 125.3 | — | 14 |
| 10 | " | " | " | " | " | 121.5 | — | 17 |

What is claimed is:

1. A pressureless sintered zirconia ceramic composition consisting essentially of a compound of $ZrO_2$ consisting essentially of 0.5–5.0 mol% $Y_2O_3$ as a stabilizer and 1–30 wt% aluminum and magnesium contents to the amount of said compound of $ZrO_2$ in terms of $Al_2O_3$ and MgO,
   wherein a molar ratio between the aluminum and magnesium contents is selected from one of the following ranges in terms of $Al_2O_3$ and MgO:
   (a) 35–45/65–55
   (b) 60–75/40–25
   (c) 85–99/15–1.

2. The pressureless sintered zirconia ceramic composition of claim 1, wherein said compound of $ZrO_2$ consists essentially of 1.5–5 mol% $Y_2O_3$ as a stabilizer.

3. The pressureless sintered zirconia ceramic composition of claim 1, wherein said compound of $ZrO_2$ consists essentially of 1–5 wt% aluminum and magnesium contents to the amount of said compound of $ZrO_2$ in terms of $Al_2O_3$ and MgO.

4. A pressureless sintered zirconia composition consisting essentially of a compound of $ZrO_2$ consisting essentially of 0.5–5 mol% $Y_2O_3$ and 0.5–12 mol% $CeO_2$ as stabilizers and 1–30 wt% aluminum and magnesium contents to the amount of said compound of $ZrO_2$ in terms of $Al_2O_3$ and MgO, the total amount of $Y_2O_3$ and $CeO_2$ being 1.0–15 mol%,
   wherein a molar ratio between the aluminum and magnesium contents is selected from one of the following ranges in terms of $Al_2O_3$ and MgO:
   (a) 35–45/65–55
   (b) 60–75/40–25
   (c) 85–99/15–1.

5. The pressureless sintered zirconia ceramic composition of claim 4, wherein said compound of $ZrO_2$ consists essentially of 1–5 wt% aluminum and magnesium contents to the amount of said compound of $ZrO_2$ in terms of $Al_2O_3$ and MgO.

* * * * *